United States Patent
Kifuku (10) Patent No.: US 9,152,364 B2
(45) Date of Patent: Oct. 6, 2015

(54) MEDIA PROCESSING DEVICE, CONTROL METHOD FOR A MEDIA PROCESSING DEVICE, AND RECORDING MEDIUM STORING A PROGRAM EXECUTED BY A CONTROL UNIT THAT CONTROLS A MEDIA PROCESSING DEVICE

(75) Inventor: Tomoharu Kifuku, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 116 days.

(21) Appl. No.: 13/234,494

(22) Filed: Sep. 16, 2011

(65) Prior Publication Data

US 2012/0072616 A1 Mar. 22, 2012

(30) Foreign Application Priority Data

Sep. 17, 2010 (JP) ................................. 2010-209285

(51) Int. Cl.
*G06K 15/00* (2006.01)
*G06F 3/12* (2006.01)
*B41J 11/00* (2006.01)

(52) U.S. Cl.
CPC ........... *G06F 3/1284* (2013.01); *B41J 11/0075* (2013.01); *G06F 3/121* (2013.01); *G06F 3/1235* (2013.01); *G06F 2206/1506* (2013.01)

(58) Field of Classification Search
CPC ............................ G06F 3/1235; B41J 11/0075
USPC .............................. 358/1.14, 1.15; 710/19, 14
See application file for complete search history.

(56) References Cited

U.S. PATENT DOCUMENTS

| | | |
|---|---|---|
| 5,594,653 A | 1/1997 | Akiyama et al. |
| 5,911,527 A | 6/1999 | Aruga et al. |
| 6,058,249 A | 5/2000 | Matsuda et al. |
| 6,198,985 B1 | 3/2001 | Miyasaka et al. |
| 6,205,363 B1 | 3/2001 | Miyasaka et al. |
| 6,292,635 B1 | 9/2001 | Tokairin et al. |
| 6,360,135 B1 | 3/2002 | Miyasaka et al. |
| 6,362,896 B1 | 3/2002 | Miyasaka et al. |
| 6,434,445 B2 | 8/2002 | Miyasaka et al. |
| 6,453,208 B2 * | 9/2002 | Miyasaka et al. ............... 700/79 |
| 6,697,678 B2 | 2/2004 | Miyasaka et al. |
| 6,975,423 B2 | 12/2005 | Koakutsu et al. |
| 7,916,316 B2 * | 3/2011 | Saikawa ....................... 358/1.14 |
| 2001/0021954 A1 * | 9/2001 | Takamizawa et al. .......... 710/19 |

(Continued)

FOREIGN PATENT DOCUMENTS

| | | | |
|---|---|---|---|
| JP | 01195591 A | 8/1989 |
| JP | 03225593 A | 10/1991 |

(Continued)

*Primary Examiner* — Ernest Unelus
(74) *Attorney, Agent, or Firm* — Nutter McClennen & Fish LLP (57) ABSTRACT

Media processing devices, media processing device control methods, and computer-readable recording mediums storing programs that can be executed by control units that control media processing devices are provided. In one embodiment, a media processing device has a plurality of operation units that process roll paper and checks as a plurality of recording media, and a central processing unit (CPU) that controls the operation units by executing commands received from a host computer. When the CPU detects during a normal operating mode that commands for any of the operation units cannot be executed, the CPU switches to a limited operation mode in which commands for that operation unit cannot be executed, but commands from the host computer can be received and commands for other operation units can be executed.

17 Claims, 8 Drawing Sheets

(56) References Cited

U.S. PATENT DOCUMENTS

2003/0076525 A1    4/2003  Hikawa
2005/0243332 A1*  11/2005  Kinoshita ..................... 358/1.1
2006/0055972 A1*   3/2006  Saikawa ..................... 358/1.16
2007/0296999 A1*  12/2007  Takamizawa et al. ....... 358/1.14
2011/0181905 A1*   7/2011  Saikawa ..................... 358/1.14

FOREIGN PATENT DOCUMENTS

| JP | 10119391 A | 5/1998 |
| JP | 2002200804 A | 7/2002 |
| JP | 2001-18476 A | 1/2011 |
| WO | 99/28829 A1 | 6/1999 |

\* cited by examiner

MEDIA PROCESSING DEVICE, CONTROL METHOD FOR A MEDIA PROCESSING DEVICE, AND RECORDING MEDIUM STORING A PROGRAM EXECUTED BY A CONTROL UNIT THAT CONTROLS A MEDIA PROCESSING DEVICE

CROSS REFERENCE TO RELATED APPLICATIONS

Priority is claimed under 35 U.S.C. §119 to Japanese Application No. 2010-209285 filed on Sep. 17, 2010, which is hereby incorporated by reference in its entirety.

BACKGROUND

1. Technical Field

The present invention relates to a media processing device having a recording unit that records on a recording medium, a control method for the media processing device, and a recording medium that stores a program executed by a control unit to control the media processing device.

2. Related Art

When recording cannot continue for some reason, such as running out of paper, in a recording device that records on a recording medium, the recording device typically reports an error and stops printing.

Hybrid devices that combine other functions with the functionality of a printer are now common. See, for example, Japanese Unexamined Patent Appl. Pub. JP-A-H03-225593. The device taught in JP-A-H03-225593 has a function for recording a journal in addition to functioning as a recording device for printing receipts. The device taught in JP-A-H03-225593 can also continue printing only receipts when there is no paper for recording a journal.

The device taught in JP-A-H03-225593 can thus simultaneously print receipts and a journal. However, because receipts and the journal normally record the same information, it is quite difficult to continue printing receipts after the journal paper supply runs out and then print the journal at a later time.

However, hybrid devices that have functions other than recording functions include devices that record unrelated information on different recording media, and devices with functions other than recording on recording media. When recording on the recording medium is disabled in such devices, there is no way to prevent the entire system from stopping operation.

SUMMARY

One or more embodiments of the invention enable avoiding interruption of all device functions when recording becomes disabled in a device having plural functions including recording on a recording medium.

A first aspect of at least one embodiment of the invention is a media processing device including a plurality of operation units that respectively process a plurality of recording media, and a control unit that executes commands received from a host computer and controls the operation units. When the control unit detects in a normal operating mode that commands for any one of the operation units cannot be executed, the control unit switches to a limited operation mode wherein commands for the one of the operation units cannot be executed, and commands from the host computer can be received and commands for others of the operation units can be executed. With this aspect of the invention, when a problem occurs in any of the operation units that process the recording media and the operation unit cannot execute operating commands, the control unit disables execution of commands for that operation unit while continuing to receive commands from the host computer and executing commands for other operation units. As a result, the control unit can receive other commands and can continue to operate the other operation units according to the received commands. As a result, a media processing device that can perform plural operations can be prevented from having all device functions stop when there is a problem with one operation.

In a media processing device according to another aspect of at least one embodiment of the invention, when a command for the one of the operation units that cannot execute commands is received from the host computer after entering the limited operation mode, the control unit enters a stop operation mode in which receiving further commands and executing commands for the others of the operation units are also disabled. With this aspect of the invention, a media processing device that can perform plural operations can prevent all device functions from stopping when there is a problem with one operation. Continuing to receive commands that cannot be executed, and losing commands that cannot be executed, can also be avoided by entering a stop operation mode that disables receiving commands and operation by other operation units when a command is received for an operation unit that cannot execute commands. As a result, the host computer can more reliably control the media processing device.

In a media processing device according to another aspect of at least one embodiment of the invention, the control unit in the stop operation mode can receive and execute real-time control commands sent from the host computer, and can send an operating status to the host computer. This aspect of the invention enables the control unit to reliably report the stop operation mode to the host computer and enables reliable control by the host computer because the control unit can receive and execute real-time control commands that are sent from the host computer and return the current operating status to the host computer even in the stop operation mode. In addition, the control unit can be instructed by the host computer to delete already received commands, and can be made to recover from the stop operation mode.

A media processing device according to another aspect of at least one embodiment of the invention also has an operating unit, and the control unit cancels the limited operation mode and returns to the normal operating mode when a reason for entering the limited operation mode is resolved by specific input from the operating unit, or by executing a specific command received from the host computer. With this aspect of the invention, the control unit can easily return from the stop operation mode or the limited operation mode to the normal operating state (normal operating mode) as a result of user action or a command sent from the host computer.

In a media processing device according to another aspect of at least one embodiment of the invention, the control unit sends a signal to the host computer indicating that commands for the one f the operation units that cannot execute commands cannot be executed when entering the limited operation mode. With this aspect of the invention, the control unit sends a signal telling the host computer that commands cannot be executed, and the host computer can know that the media processing device has entered the limited operation mode. As a result, the host computer stops sending operating commands to the media processing device, switches to an operation for canceling the limited operation mode, and can efficiently and reliably control the media processing device.

In a media processing device according to another aspect of at least one embodiment of the invention, the plurality of recording media includes roll paper and slips, the plurality of operation units includes a roll paper operation unit that processes the roll paper and a slip operation unit that processes the slips, the roll paper operation unit has a recording unit for recording on the roll paper, and the slip operation unit has a recording unit for recording on the slips. In a media processing device that uses roll paper and slips as recording media according to this aspect of the invention, when a problem occurs in the roll paper operation unit or the slip operation unit and the operation unit cannot execute operating commands, the control unit disables execution of commands for that operation unit while continuing to receive commands from the host computer and executing commands for other operation units. As a result, the control unit can receive other commands and can continue to operate the other operation units according to the received commands. As a result, a media processing device that can perform plural operations can be prevented from having all device functions stop when there is a problem with one operation.

Another aspect of at least one embodiment of the invention is a media processing device control method that controls a media processing device having a plurality of operation units for processing a plurality of recording media, including executing commands received from a host computer and controlling the operation units corresponding to the commands, detecting in a normal operating mode that commands for one of the operation units cannot be executed, and enabling a limited operation mode wherein commands for the one the operation units cannot be executed, and commands from the host computer can be received and commands for others of the operation units can be executed, when it is detected that commands for the one of the operation units cannot be executed. By executing the control method according to this aspect of the invention, because a media processing device having a plurality of operation units for processing different recording media can disable execution of commands for that operation unit while continuing to receive commands from the host computer and executing commands for other operation units when a problem occurs in one operation unit and the operation unit cannot execute operating commands, other commands can be received and operating the other operation units according to the received commands can continue. As a result, a media processing device that can perform plural operations can be prevented from having all device functions stop when there is a problem with one operation.

Another aspect of at least one embodiment of the invention is a program that can be executed by a control unit that controls a media processing device having a plurality of operation units for processing a plurality of recording media, the program causing the control unit to execute steps including executing commands received from a host computer and controlling the operation units corresponding to the commands, detecting in a normal operating mode that commands for one of the operation units cannot be executed, and enabling a limited operation mode wherein commands for the one of the operation units cannot be executed, and commands from the host computer can be received and commands for others of the operation units can be executed, when it is detected that commands for the one of the operation units cannot be executed. By executing the program according to this aspect of the invention, the control unit disables execution of commands for that operation unit while continuing to receive commands from the host computer and executing commands for other operation units when a problem occurs in any of the plural operation units that process the recording media and the operation unit cannot execute operating commands. As a result, the control unit can receive other commands and can continue to operate the other operation units according to the received commands. As a result, a media processing device that can perform plural operations can be prevented from having all device functions stop when there is a problem with one operation.

Effect of the Invention

One or more embodiments of the invention enable avoiding interruption of all device functions when a problem occurs with one operation in a media processing device that can perform multiple operations.

Other objects and attainments together with a fuller understanding of the invention will become apparent and appreciated by referring to the following description and claims taken in conjunction with the accompanying drawings.

DESCRIPTION OF EMBODIMENTS

A preferred embodiment of the present invention is described below with reference to the accompanying figures.

Figure 1:
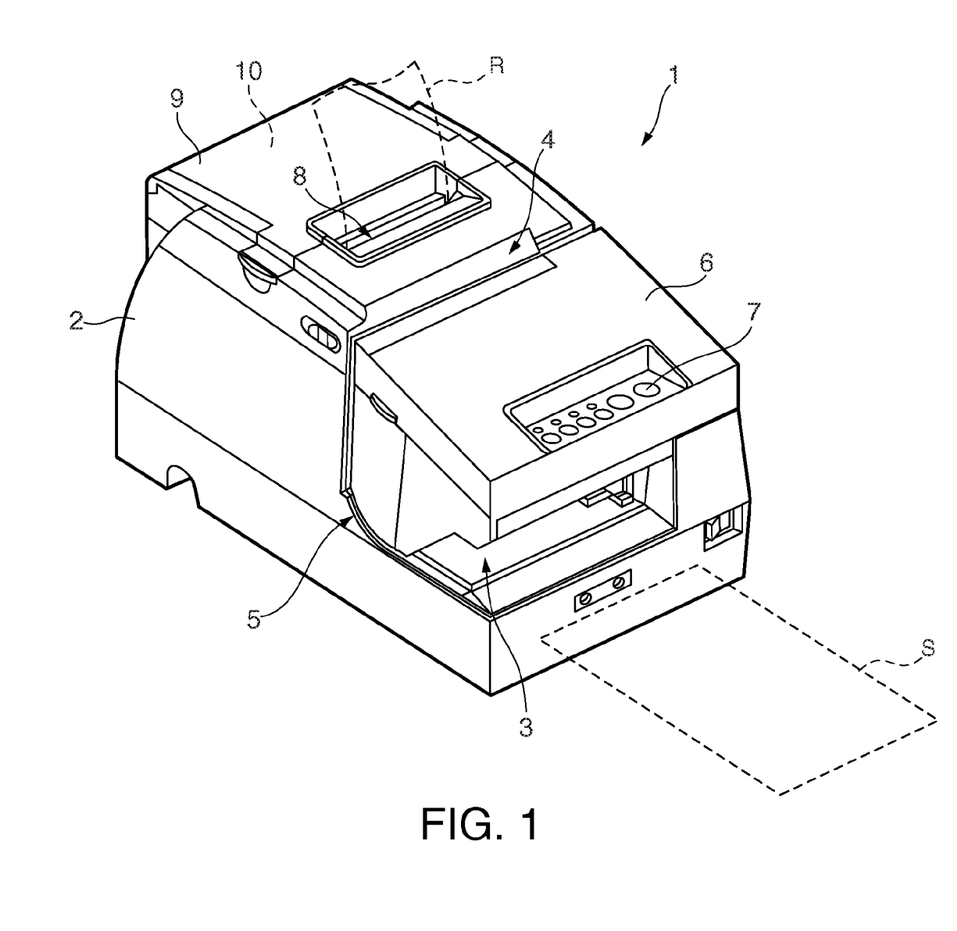
FIG. 1 is an external oblique view of a hybrid processing device according to a preferred embodiment of the invention.

FIG. 1 is an external oblique view of a hybrid processing device as an example of a media processing device according to a preferred embodiment of the invention. This hybrid processing device (media processing device) 1 reads an MICR (magnetic ink character recognition) line of magnetic ink characters recorded on a check (slip or recording medium) S, and performs a printing (recording) process on the check S according to the read content. The hybrid processing device 1 also stores roll paper (recording medium) R of thermal paper wound in a roll inside, and performs a printing (recording) process on this roll paper.

As shown in FIG. 1, the hybrid processing device 1 has a basically rectangular box-like case 2. A media entrance 3 for inserting the check S is disposed with a specific width transversely to the device 1 at a front left side of the case 2. A media exit 4 from which the processed check S is discharged is disposed with a specific width transversely to the device 1 in a top of the case 2 in a middle of a longitudinal direction, that is, between a front and a back of the device 1. A media conveyance path 5 that extends from the media entrance 3 in a curve to the back and the top is formed between the media entrance 3 and the media exit 4. The media entrance 3, the media exit 4, and the media conveyance path 5 are formed opening to the left side of the case 2, enabling conveyance of a check that is wider than the media entrance 3, the media exit 4, and the media conveyance path 5.

A front cover 6 covers the top of the case 2 in front of the media exit 4, and an operating panel 7 (operating unit) used to operate the hybrid processing device 1 is disposed at a front end of the front cover 6. A roll paper exit 8 from which the roll paper R is discharged after printing is disposed with a specific width transversely to the device 1 in the top of the case 2 behind the media exit 4. An access cover 9 is also disposed to the top of the case 2 behind the roll paper exit 8, and this access cover 9 is attached pivotably at the rear end thereof to the case 2. When the access cover 9 opens, the roll paper compartment 10 that stores the roll paper R is exposed, and the roll paper R can be replaced. The roll paper R has a web of thermal paper wound onto a core into a roll.

Figure 2:
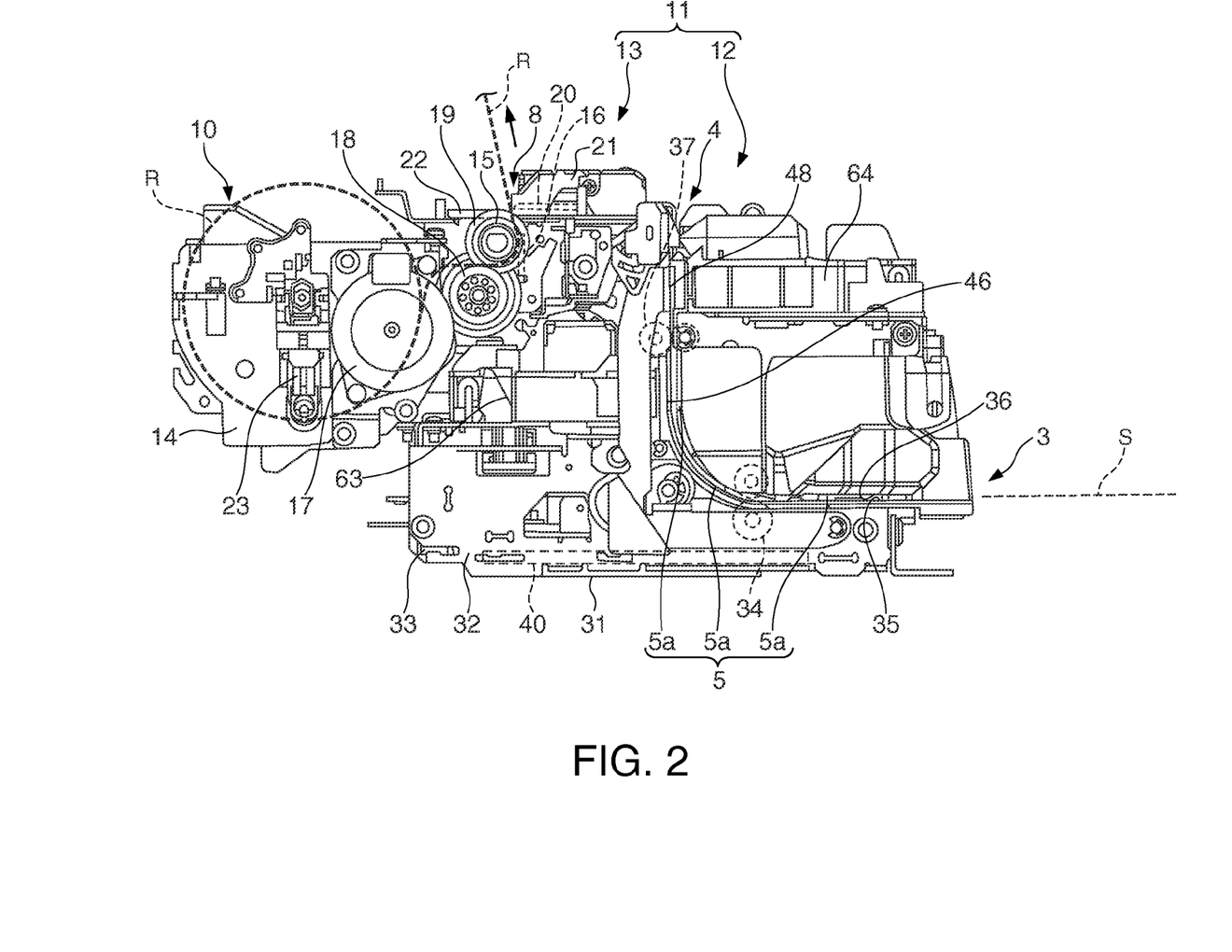
FIG. 2 is a schematic side view of a main unit of the hybrid processing device of FIG. 1.

FIG. 2 is a side view showing a main unit 11 of the hybrid processing device 1. FIG. 2 shows the hybrid processing device 1 with the case 2, the front cover 6, the access cover 9, and other exterior parts removed. As shown in FIG. 2, the main unit 11 includes a slip print unit 12 for printing on the check S and other slips, and a roll paper print unit 13 for printing on the roll paper R, rendered in unison.

The roll paper print unit 13 includes a left side frame 14 and a paired right side frame (not shown in the figure), and a roll paper holder (not shown in the figure) disposed between the left and right side frames and forming the bottom, front, and back sides of the roll paper compartment 10. The roll paper holder holds the roll paper R so that the roll paper R can rotate freely, and assures that the roll paper R can roll freely inside the roll paper compartment 10.

A platen roller 15 is disposed freely rotatably between the left and right side frames near the roll paper exit 8.

A thermal printhead 16 is disposed in front of the platen roller 15 at a position opposite the platen roller 15, and the thermal printhead 16 has a plurality of heating resistors in the face thereof opposing the platen roller 15. A leading end of the roll paper R stored in the roll paper compartment 10 is held between the platen roller 15 and the thermal printhead 16, and is conveyed toward the roll paper exit 8 by rotation of the platen roller 15. When the roll paper R passes between the platen roller 15 and the thermal printhead 16, content such as text and images is recorded on the roll paper R by heat emitted from the thermal printhead 16. A roll paper conveyance motor 17 is disposed to the left side frame 14. Rotation of the roll paper conveyance motor 17 is transferred through an intermediate gear 18 to a drive gear 19 disposed coaxially to the platen roller 15, and the platen roller 15 turns.

An automatic paper cutter unit 21 with an internal movable knife 20 and a cutter drive motor 24 (see FIG. 4) for operating the movable knife 20 is disposed above the platen roller 15. A fixed knife 22 is disposed behind the automatic paper cutter unit 21 with the roll paper exit 8 therebetween. The leading end part of the roll paper R passes between the movable knife 20 and the fixed knife 22 to the roll paper exit 8, and when the roll paper R is cut, the cutter drive motor 24 causes the movable knife 20 to move to the back toward the fixed knife 22 and together with the fixed knife 22 cut the roll paper R.

A remaining roll paper sensor 23 that detects how much roll paper R remains inside the roll paper compartment 10 is also disposed to the left side frame 14.

As shown in FIG. 2, the slip print unit 12 has a main frame 33 including a base frame 31, and a left side frame 32 and a right side frame (not shown in the figure) that rise from the base frame 31. A pair of top and bottom paper guide members forming a bottom guide surface 35 and a top guide surface 36 are disposed to the main frame 33, and a gap between the bottom guide surface 35 and top guide surface 36 is formed as the media conveyance path 5. The media conveyance path 5 includes a horizontal conveyance path portion 5a that extends from the media entrance 3 horizontally toward the back of the device 1, a curved conveyance path portion 5b that curves upward from a back end of the horizontal conveyance path portion 5a, and a vertical conveyance path portion 5c that extends up from a top end of the curved conveyance path portion 5b and communicates with the media exit 4.

A pair of first conveyance rollers 34 is disposed in opposition at the bottom guide surface 35 and the top guide surface 36 at a junction between the horizontal conveyance path portion 5a and the curved conveyance path portion 5b. A pair of second conveyance rollers 37 is disposed in opposition at the bottom guide surface 35 and the top guide surface 36 of the vertical conveyance path portion 5c. The first conveyance rollers 34 and the second conveyance rollers 37 rotate when driven by the slip conveyance motor 38 (FIG. 4) and convey the check S.

The first conveyance rollers 34 and the second conveyance rollers 37 are configured so that one roller of each roller pair can move to and away from the other roller, and open and close the media conveyance path 5 when the roller pairs are driven together or apart by a roller opening motor 39 (FIG. 4) connected to the one roller of each pair.

A control circuit board 40 that controls overall operation of the hybrid processing device 1 based on a control program that is disposed to the base frame 31.

Figure 3:
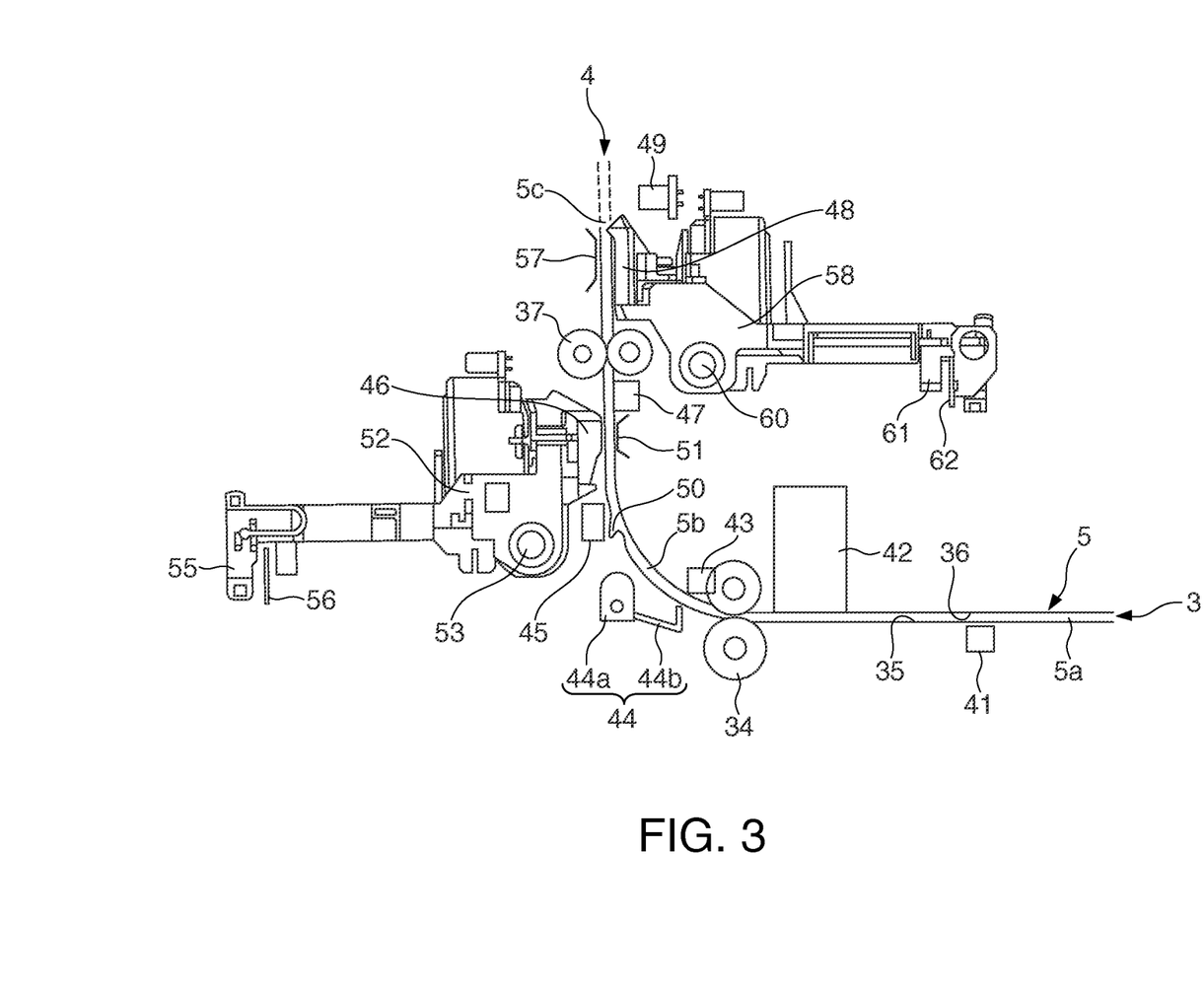
FIG. 3 shows various parts disposed to a media conveyance path of the hybrid processing device of FIG. 1.

FIG. 3 shows selected components disposed along the media conveyance path 5.

Disposed to the media conveyance path 5 in sequence from the media entrance 3 side are a BOF (bottom of form) sensor 41, a MICR head 42, the first conveyance rollers 34, a TOF (top of form) sensor 43, an alignment means 44, a validation sensor 45, a first printhead (recording head) 46, a MOP (middle of paper pass) sensor 47, the second conveyance rollers 37, a second printhead (other recording head) 48, and an EJD (slip ejection detector) sensor 49.

The BOF sensor 41, the TOF sensor 43, the validation sensor 45, the MOP sensor 47, and the EJD sensor 49 are, for example, transmissive or reflective photosensors, and contactlessly detect the presence of the check S at their respective positions on the media conveyance path 5.

The BOF sensor 41 detects a trailing end of the check S inserted from the media entrance 3, and is disposed to the bottom guide surface 35 near the media entrance 3.

The TOF sensor 43 detects a leading end of a check S inserted from the media entrance 3, and is disposed to the top guide surface 36 on a side closer to the media exit 4 than the first conveyance rollers 34.

The EJD sensor 49 detects discharge of the check S processed by the slip print unit 12 from the media exit 4, and is disposed near the media exit 4.

The MOP sensor 47 detects presence of the check S conveyed through the media conveyance path 5, and is disposed to the top guide surface 36 on a side closer to the media entrance 3 than the second conveyance rollers 37.

The slip print unit 12 in this embodiment of the invention can perform a validation printing process that prints on the check S inserted from the media exit 4 by means of the first printhead 46 and the second printhead 48, and then discharges the check S after printing from the media exit 4. As a result, a recess 50 that aligns the check S as a result of the leading end of the check S inserted from the media exit 4 entering the recess 50 is formed at an upper end of the curved conveyance path portion 5b of the media conveyance path 5. The validation sensor 45 detects entry of a distal end of the check S to the recess 50, and is disposed to a position opposite the recess 50.

The MICR head 42 reads magnetic ink characters recorded on a surface of a check S, and is disposed to the top guide surface 36 in the horizontal conveyance path portion 5a of the media conveyance path 5. Presence of the check S is determined based on data read by the MICR head 42.

The alignment means 44 pauses the check S inserted from the media entrance 3, and is disposed on the media exit 4 side of the TOF sensor 43. The alignment means 44 includes a stopper drive unit 44a such as a solenoid, for example, and a stop 44b that moves in and out of the media conveyance path 5 according to how the stopper drive unit 44a is operated, and the check S is aligned by the leading end of the check S stopping at the stop 44b.

The first printhead 46 is for printing required endorsement information required by a business, such as a customer identification number, date, and check amount, on a back side of the check S conveyed through the media conveyance path 5, and is a serial impact dot matrix (SIDM) printhead that prints by striking an ink ribbon with recording wires to transfer ink from the ink ribbon onto the recording medium. The first printhead 46 is located at a lower end of the vertical conveyance path portion 5c of the media conveyance path 5. A first platen 51 is disposed widthwise to the main frame 33 (FIG. 2) at a position opposite the first printhead 46 with the vertical conveyance path portion 5c therebetween. The first printhead 46 is mounted on a first carriage 52 disposed on a side of the vertical conveyance path portion 5c toward the back of the device 1. The first carriage 52 can slide freely along a first carriage shaft 53 disposed horizontally between the left and right side frames of the main frame 33 (FIG. 2), and moves bidirectionally along the first carriage shaft 53 when driven by the first carriage motor (drive means, see FIG. 4) 54. The first carriage 52 is connected to a first carriage motor 54 by an intervening timing belt (not shown in the figure). The first carriage motor 54 is a stepper motor, and can move the first carriage 52 a distance equivalent to a desired number of steps as controlled by the control circuit board 40.

A first carriage sensor (detection means) 55 that detects a position of the first carriage 52 is disposed to a bottom of the first carriage 52. The first carriage sensor 55 is a transmissive photosensor, and scans a first scale 56 disposed substantially parallel to the first carriage shaft 53 in conjunction with the bidirectional movement of the first carriage 52.

Multiple slits of a specified width are formed in this first scale 56, and displacement of the first carriage 52 is detected and the position of the first carriage 52 (first printhead 46) is detected by capturing the optical signals passing these slits as the first carriage sensor 55 scans the first scale 56. In this embodiment of the invention power is supplied to the first carriage sensor 55 only while driving the first carriage motor 54, and because power supply to the first carriage sensor 55 stops when the first carriage motor 54 stops, power consumption is reduced while waiting and reduced power consumption can be achieved.

The second printhead 48 prints essential information such as payee, date, check amount, etc. on a front of the check S conveyed through the media conveyance path 5, and is rendered by a SIDM printhead identical to the first printhead 46. This second printhead 48 is located above the first printhead 46, and is disposed on the side of the vertical conveyance path portion 5c to the front of the device. A second platen 57 is disposed widthwise to the main frame 33 (FIG. 2) at a position opposite the second printhead 48 with the vertical conveyance path portion 5c therebetween.

Like the first printhead 46, the second printhead 48 is carried on a second carriage (other carriage) 58, and the second carriage 58 moves bidirectionally along a second carriage shaft (other carriage shaft) 60 as driven by a second carriage motor (other drive means, see FIG. 4) 59.

A second carriage sensor (other detection means) 61 is disposed to a bottom of the second carriage 58, and the second carriage sensor 61 scans a second scale (other scale) 62 disposed substantially parallel to the second carriage shaft 60 in conjunction with bidirectional movement of the second carriage 58.

The second carriage motor 59 is also rendered by a stepper motor similar to the first carriage motor 54.

A first ink ribbon cassette 63 (FIG. 2) and a second ink ribbon cassette 64 (FIG. 2) that store the ink ribbons that are conveyed respectively between the first printhead 46 and the first platen 51 and the second printhead 48 and the second platen 57 are removably installed to the main frame 33.

Figure 4:
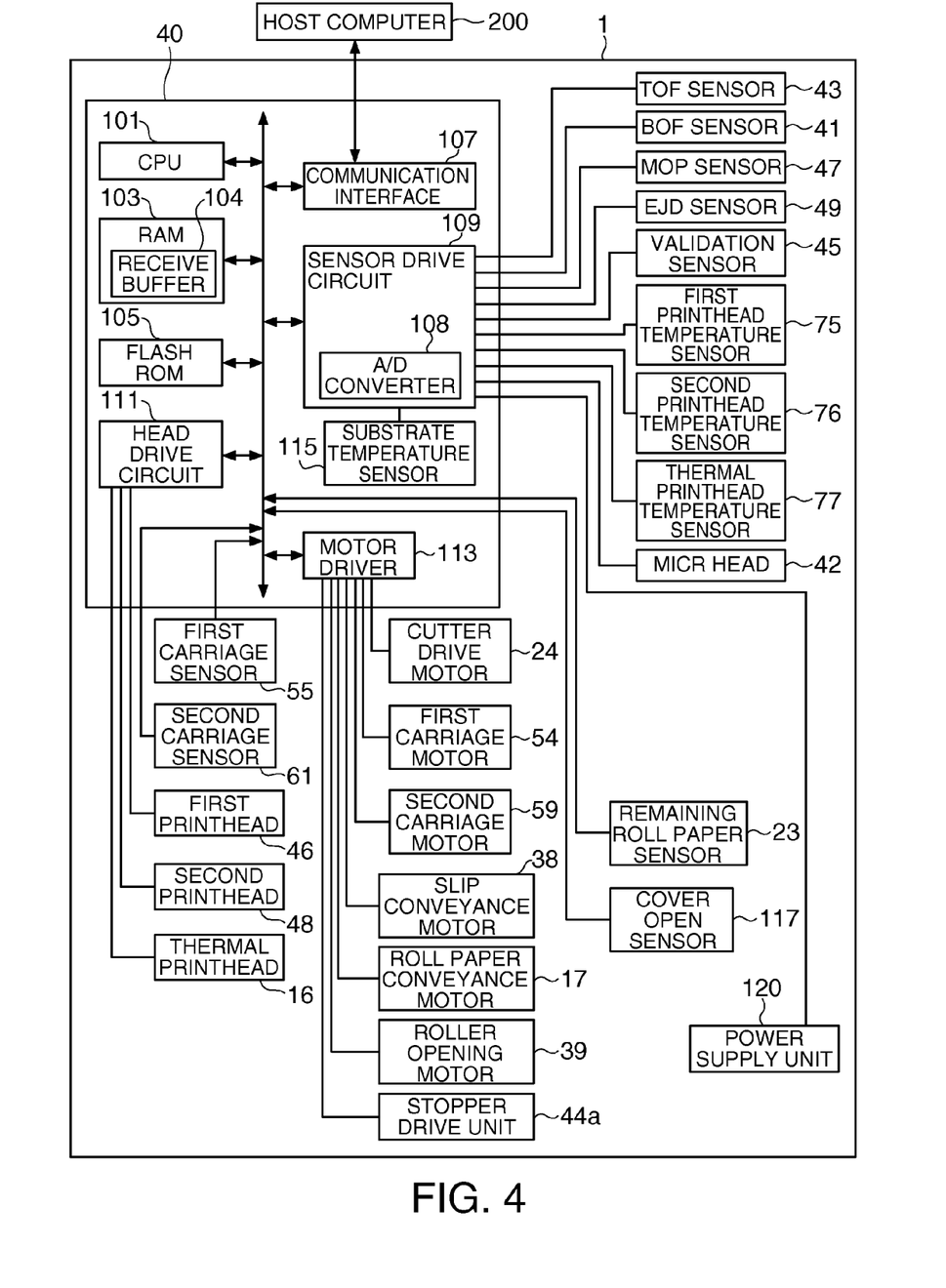
FIG. 4 is a block diagram of a functional configuration of the hybrid processing device of FIG. 1.

FIG. 4 is a block diagram showing a functional configuration of the hybrid processing device 1.

As shown in FIG. 4, a control system of the hybrid processing device 1 includes various drive units such as motors and various sensors connected to a control unit mounted on the control circuit board 40.

The control circuit board 40 includes a central processing unit (CPU) 101 (control unit) that executes a control program and controls other parts; random access memory (RAM) 103 that temporarily stores processed data and the programs executed by the CPU 101; flash read only memory (flash ROM) 105 that stores settings and a basic control program executed by the CPU 101; and a communication interface 107 that communicates commands and data with a host computer 200 as an external device connected to the hybrid processing device 1.

The control circuit board 40 also has a sensor drive circuit 109 with an internal analog/digital (A/D) converter 108, and converts output from the sensors of the hybrid processing device 1 to digital data and outputs to the CPU 101; a head drive circuit 111 that drives the printheads of the hybrid processing device 1; and a motor driver 113 that drives the motors of the hybrid processing device 1. The different parts of the control circuit board 40 are communicably connected to each other. How the various functional parts of the control circuit board 40 are specifically rendered can be determined as desired, including rendering individual units as discrete semiconductor devices, and rendering the functions of plural functional parts using a system-on-a-chip (SOC) design.

A substrate temperature sensor 115 that detects the temperature of the motor driver 113 is mounted on the control circuit board 40. The substrate temperature sensor 115 is a thermistor disposed on a back side of the control circuit board 40 where the motor driver 113 is mounted, or near the motor driver 113.

A remaining roll paper sensor 23 that detects if the amount of roll paper R stored in the roll paper compartment 10 (FIG. 1) exceeds a particular amount, a cover open sensor 117 that detects if the access cover 9 is open, and the first carriage sensor 55 and second carriage sensor 61 described above, are connected to the CPU 101.

The remaining roll paper sensor 23 is a switch type of sensor that switches on when an outside diameter of the roll paper R is greater than or equal to a set size, the cover open sensor 117 is a switch sensor that switches on when the access cover 9 opens, and both sensors 23, 117 output HIGH/LOW according to the on/off state. The first carriage sensor 55 and the second carriage sensor 61 are rendered as photo interrupters, for example, and switch the output HIGH/LOW according to whether or not the amount of light detected by a light receiving unit exceeds an internally stored threshold value.

When the operating panel 7 is operated, an operation signal is input from the operating panel 7 to the CPU 101, enabling the operation performed on the operating panel 7 to be detected from the operation signal.

The CPU 101 controls parts mounted on the control circuit board 40 by reading and executing the basic control program stored in the flash ROM 105. Based on sensor values input through the sensor drive circuit 109, and output values of the remaining roll paper sensor 23, the cover open sensor 117, the first carriage sensor 55, and the second carriage sensor 61, the CPU 101 performs operations including monitoring the operating status of the hybrid processing device 1, driving the heads by means of the head drive circuit 111, operating the motors by means of the motor driver 113, printing on the front and back sides of the check S, reading the MICR line, and printing on the roll paper R.

The RAM 103 is used as working memory for temporarily storing programs and data used for CPU 101 operation. A receive buffer 104 that temporarily stores commands and data received from the host computer 200 through the communication interface 107 is provided in the RAM 103. The CPU 101 reads and executes the commands stored in the receive buffer 104 in the order received.

The sensor drive circuit 109 is connected to the BOF sensor 41, the TOF sensor 43, the validation sensor 45, the MOP sensor 47, the EJD sensor 49, and the substrate temperature sensor 115, converts the sensor output values to digital data, and outputs the digital data to the CPU 101. The sensor drive circuit 109 is also connected to the MICR head 42, and outputs the output values of the MICR head 42 as digital data to the CPU 101 while reading the magnetic ink characters printed on the check S by the MICR head 42.

A first printhead temperature sensor 75, a second printhead temperature sensor 76, and a thermal printhead temperature sensor 77 are also connected to the sensor drive circuit 109. The first printhead temperature sensor 75 is disposed to the first printhead 46, and the second printhead temperature sensor 76 is disposed to the second printhead 48. The first printhead temperature sensor 75 and the second printhead temperature sensor 76 are disposed near a solenoid that drives the recording wires, and detect the temperature of and near the respective solenoid. The thermal printhead temperature sensor 77 is disposed near heating elements of the thermal printhead 16, and detects a temperature of the heating elements. The first printhead temperature sensor 75, the second printhead temperature sensor 76, and the thermal printhead temperature sensor 77 are rendered by thermistors, and the sensor drive circuit 109 outputs the output values of the first printhead temperature sensor 75, the second printhead temperature sensor 76, and the thermal printhead temperature sensor 77 as digital data to the CPU 101. Based on the temperatures determined from the output values of the first printhead temperature sensor 75, the second printhead temperature sensor 76, and the thermal printhead temperature sensor 77, the CPU 101 controls the thermal printhead 16, the first printhead 46, and the second printhead 48. More specifically, the CPU 101 unconditionally pauses operation of the respective heads when the temperature of the thermal printhead 16, the first printhead 46, or the second printhead 48 exceeds a previously set threshold value. In this case the CPU 101 resumes operation when the temperature of the paused head goes below the set threshold value.

The head drive circuit 111 records on the check S by energizing solenoid coils of the first printhead 46 and the second printhead 48 to make the recording wires strike the ink ribbon as controlled by the CPU 101. The head drive circuit 111 also energizes the heating elements (not shown in the figure) of the thermal printhead 16 as controlled by the CPU 101 to apply heat to and record on the recording surface of the roll paper R.

The motor driver 113 outputs drive power and drive pulses as controlled by the CPU 101 to the roll paper conveyance motor 17, the cutter drive motor 24, the slip conveyance motor 38, the roller opening motor 39, the stopper drive unit 44a, the first carriage motor 54, and the second carriage motor 59, which are stepper motors. The drive power supplied to the motors by the motor driver 113 is 24-VDC power supplied from a power supply unit 120 to the different parts. The power supply unit 120 supplies DC power to drive units of the hybrid processing device 1 shown in FIG. 4, that is, the printheads (the first printhead 46, the second printhead 48, and the thermal printhead 16), motors (the cutter drive motor 24, the first carriage motor 54, the second carriage motor 59, the slip conveyance motor 38, the roll paper conveyance motor 17, and the roller opening motor 39), the stopper drive unit 44a, and the control circuit board 40. Power is also supplied from the power supply unit 120 to the sensors of the hybrid processing device 1 through the control circuit board 40, or through the sensor drive circuit 109 mounted on the control circuit board 40.

Output voltage of the power supply unit 120 is input to the sensor drive circuit 109, and the sensor drive circuit 109 outputs a voltage level of the supply voltage from the power supply unit 120 as digital data to the CPU 101. Based on the digital data, the CPU 101 determines whether or not the power supply unit 120 voltage is within a normal range.

The hybrid processing device 1 can thus read the MICR line and print on checks, and can print on roll paper. The operating units that are used to process checks as controlled by the control circuit board 40, that is, the slip conveyance motor 38, the roller opening motor 39, the alignment means 44, the first printhead 46, the second printhead 48, the first carriage motor 54, and the second carriage motor 59, embody a slip operation unit. The slip operation unit also include the slip print unit 12. The operating units used to process roll paper R, that is, the thermal printhead 16, the roll paper conveyance motor 17, and the cutter drive motor 24, embody a roll paper operation unit. The roll paper operation unit also include the roll paper print unit 13.

Operation of the hybrid processing device 1 is described next. The operation described below is achieved by the CPU 101 executing a program stored in the flash ROM 105.

The hybrid processing device 1 enters a standby mode after the power turns on. In the standby mode the hybrid processing device 1 moves the first conveyance rollers 34 and the second conveyance rollers 37 to an open position by means of the roller opening motor 39, and the check S can be inserted to the media entrance 3. The hybrid processing device 1 also moves the stop 44b into the media conveyance path 5 by means of the stopper drive unit 44a.

Figure 5:
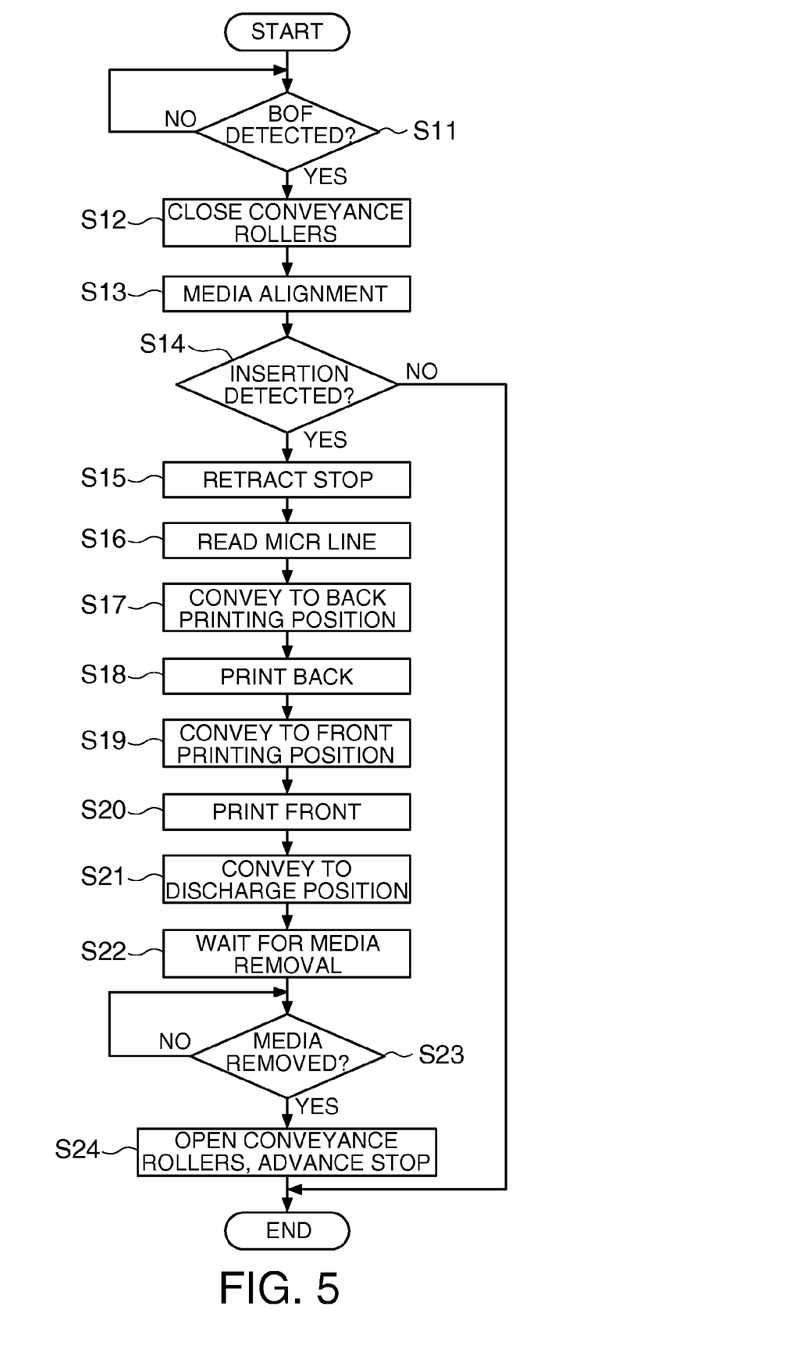
FIG. 5 is a flow chart showing a preferred embodiment of a normal check processing operation.

When insertion of the check S is detected in the standby state, the CPU 101 processes the check S as shown in FIG. 5.

Figure 6:
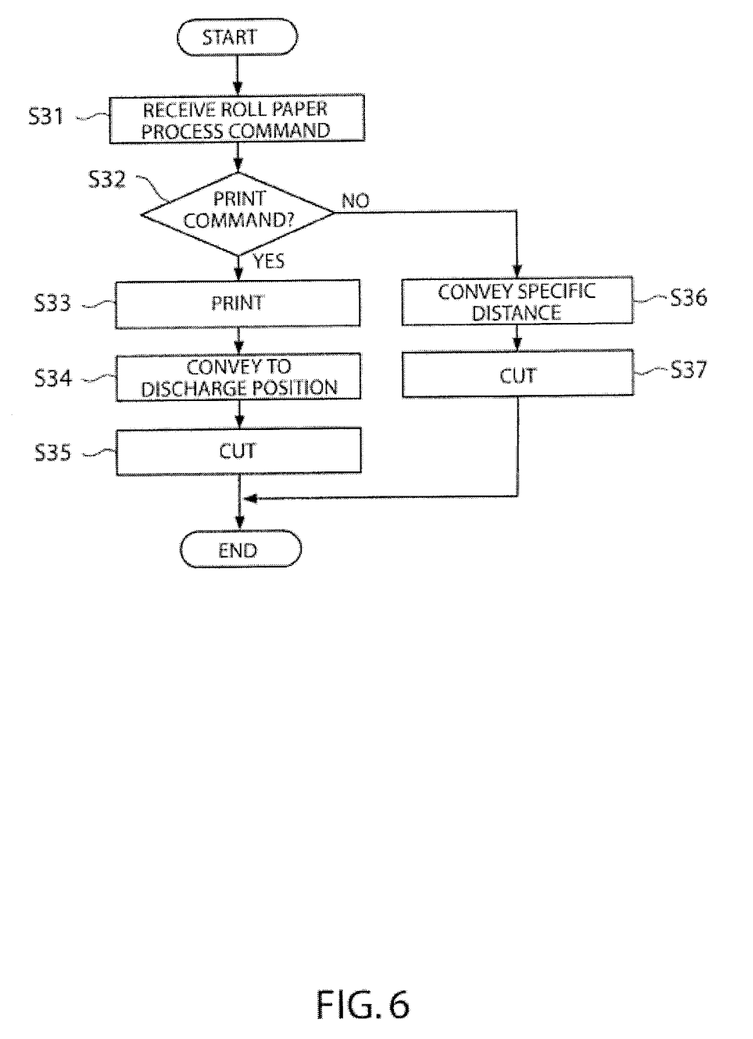
FIG. 6 is a flow chart showing a preferred embodiment of a normal roll paper printing operation.

When a command for processing roll paper is received from the host computer 200 while in the standby mode, the CPU 101 processes the roll paper R as shown in FIG. 6.

Figure 7:
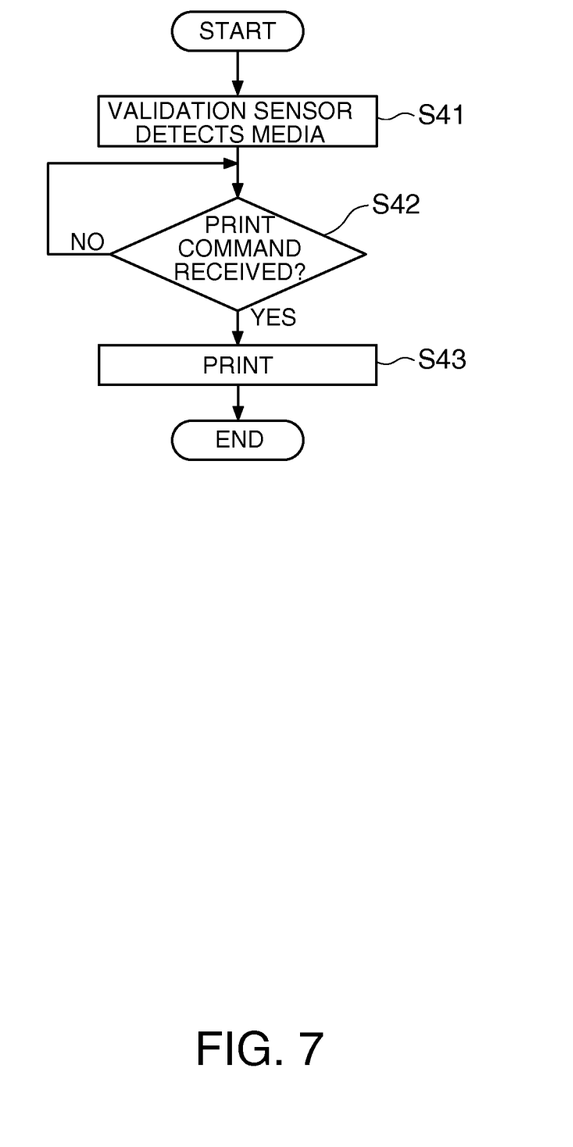
FIG. 7 is a flow chart showing a preferred embodiment of a normal operation for validation printing.

When the check S is inserted from the media exit 4 in the standby mode, the CPU 101 performs the validation printing process as shown in FIG. 7.

FIG. 5 is a flow chart showing the operation of the hybrid processing device 1 during a normal operation for processing a check.

In the standby mode described above, the CPU 101 waits for insertion of a check from the media entrance 3 (step S11). When the CPU 101 detects the check S based on the output from the BOF sensor 41 input from the sensor drive circuit 109 (step S11 returns Yes), the CPU 101 controls the motor driver 113, drives the roller opening motor 39 to move the first conveyance rollers 34 and the second conveyance rollers 37 to a closed position, and holds the check S by means of the first conveyance rollers 34 (step S12).

With the stop 44b intervening in the media conveyance path 5, the CPU 101 then operates the slip conveyance motor 38 and rotationally drives the first conveyance rollers 34 to align the check S by moving the check S back and forth plural times (step S13). This alignment operation drives the check S against the stop 44b and aligns the check's orientation.

The CPU 101 detects the presence of a check based on the output of the BOF sensor 41 (step S14), and if a check is not detected, determines that an operating error occurred or the check S was removed and aborts this process.

If the check S is detected by the BOF sensor 41 (step S14 returns Yes), the CPU 101 drives the stopper drive unit 44a and retracts the stop 44b from the media conveyance path 5 (step S15).

The CPU 101 then reads the magnetic ink characters on the check S based on output values from the MICR head 42 while conveying the check S by the first conveyance rollers 34 (step S16).

When printing on the back of the check S is instructed by a command received from the host computer 200, the CPU 101 conveys the check S to a printing position by driving the slip conveyance motor 38 forward and conveying the check S to a downstream side of the media conveyance path 5, or reversing the slip conveyance motor 38 and conveying the check S to an upstream side of the media conveyance path 5 (step S17). The CPU 101 then prints on the back of the check S by the first printhead 46 (step S18).

When printing on the front of the check S is instructed by a command received from the host computer 200, the CPU 101 conveys the check S to a front printing position (step S19). More specifically, the CPU 101 conveys the check S to the front printing position by driving the slip conveyance motor 38 forward and conveying the check S to the downstream side of the media conveyance path 5, or reversing the slip conveyance motor 38 and conveying the check S to the upstream side of the media conveyance path 5 according to the front printing position on the check S. After the check S reaches the front printing position, the CPU 101 controls the head drive circuit 111 and prints on the front of the check S by the second printhead 48 (step S20).

After printing the check front ends, the CPU 101 drives the slip conveyance motor 38 and discharges the check S from the media exit 4 by the second conveyance rollers 37 (step S21).

The check S reaches a position protruding from the media exit 4 at this time, but the trailing end of the check S is still inside the media exit 4 and the presence of the check S is detected by the EJD sensor 49. The CPU 101 waits until the operator removes the check S (step S22). When the check S is removed and the CPU 101 detects the change in the detection state of the EJD sensor 49 (step S23 returns Yes), the CPU 101 drives the roller opening motor 39 and the stopper drive unit 44a, and returns to the standby mode described above (step S24). As a result, the hybrid processing device 1 reads the magnetic ink characters when the check S is inserted, and prints on the front and back of the check S.

FIG. 6 is a flow chart showing a normal operation when printing on roll paper.

When the CPU 101 receives a command instructing printing on roll paper from the host computer 200 (step S31), the CPU 101 starts the operation shown in FIG. 6, reads the received command from the receive buffer 104, and determines if the command is a print command (step S32). If the received command is a print command and print data is received following the command (step S32 returns Yes), the CPU 101 energizes the thermal printhead 16, applies heat to the printing surface of the roll paper R, and prints while driving the roll paper conveyance motor 17 and conveying the roll paper R (step S33). When printing is completed, the CPU 101 conveys the roll paper R until the end of printing position on the roll paper R reaches the position of the automatic paper cutter unit 21 (step S34), and then drives the cutter drive motor 24 and cuts the roll paper R (step S35).

If the command received from the host computer 200 is not a print command, the CPU 101 operates the roll paper conveyance motor 17, conveys the roll paper R a specified amount (step S36), drives the cutter drive motor 24, and cuts the roll paper R (step S37).

FIG. 7 is a flow chart of normal operation during a validation printing process.

When the check S is inserted from the media exit 4 in the standby mode and the leading end thereof reaches the recess 50, the CPU 101 detects insertion of the check S based on change in the output from the validation sensor 45 (step S41). The CPU 101 waits until a print command is received from the host computer 200 (step S42), and when a print command is received from the host computer 200 performs a validation printing process on the check S using the first printhead 46 or the second printhead 48 according to the received command (step S43). When printing is completed, the CPU 101 waits for the operator to remove the check S. When removal of the check S is detected based on change in output from the validation sensor 45 and the EJD sensor 49, the CPU 101 returns to the standby mode.

Either the slip operation unit or the roll paper operation unit become unusable in a hybrid processing device 1 that has a slip operation unit and the roll paper operation unit as described above. This could happen for many different reasons, such as the remaining roll paper sensor 23 detecting that there is insufficient roll paper R left, the cover open sensor 117 detecting that the access cover 9 is open, or the first printhead temperature sensor 75, second printhead temperature sensor 76, or thermal printhead temperature sensor 77 detecting that the corresponding head has overheated. Such events are called offline errors, and the operation unit where such an event occurs cannot continue operating until the problem is corrected.

When such an offline error occurs in a device according to the related art, the entire device goes offline and cannot receive commands sent from the host computer 200. In this embodiment of the invention, however, only the operation unit where the offline error occurs stops operating, and the other operation units and the CPU 101 can continue operating to control other parts. This is described next with reference to FIG. 8.

Figure 8:
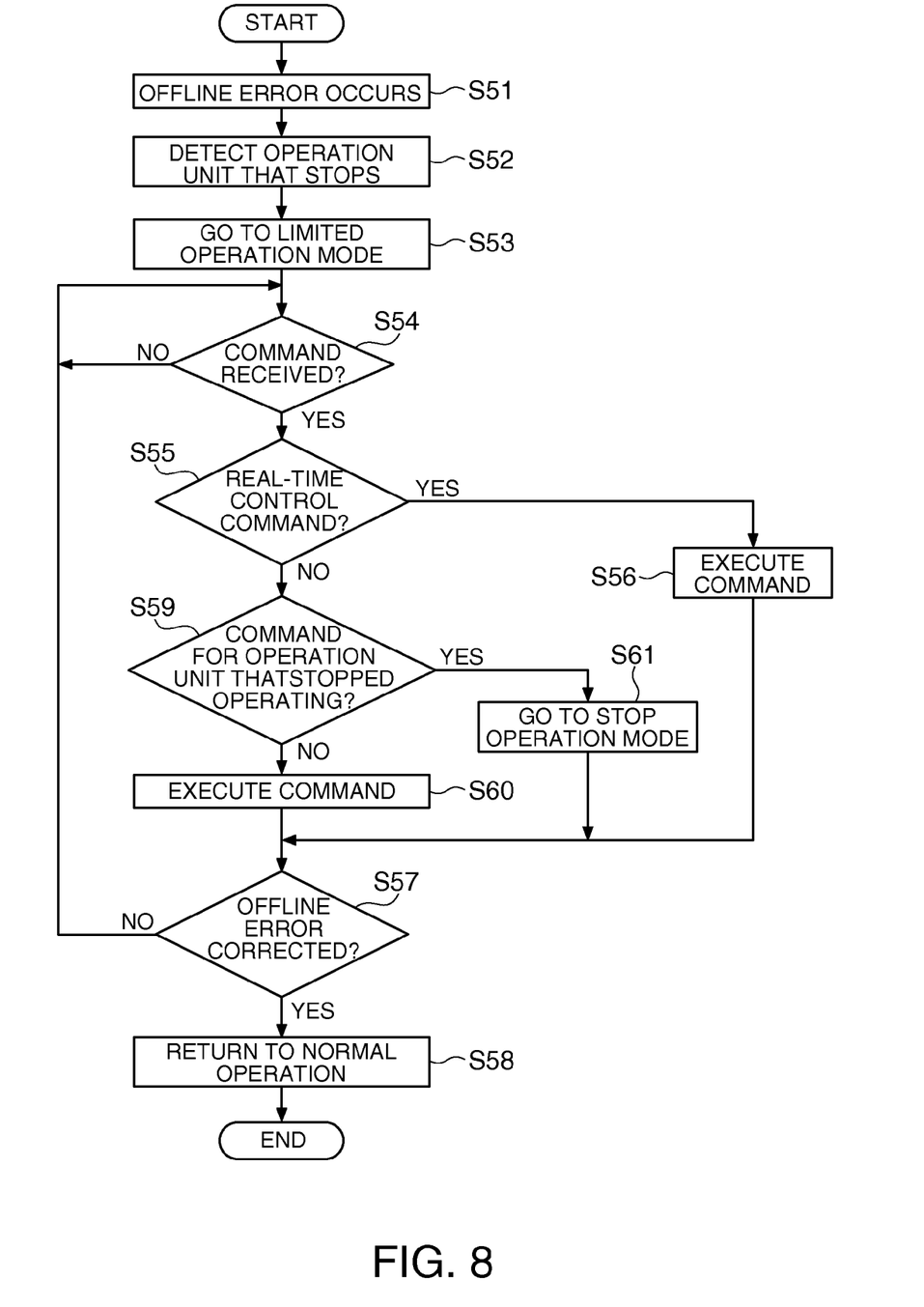
FIG. 8 is a flow chart showing a preferred embodiment of operation when an event causing a hybrid processing device to go offline occurs.

FIG. 8 is a flow chart of operation when an offline error occurs.

When an offline error occurs (step S51), the CPU 101 starts an interrupt process. The CPU 101 identifies the operation unit that must be stopped because an offline error occurred (step S52), and switches to a limited operation mode (step S53). The limited operation mode is a state in which the CPU 101 does not execute operating commands, that is, commands causing the operation unit to perform an operation, for the operation unit where the offline error occurred, but can execute commands other than operating commands for the offline operation unit.

For example, an offline error occurs in the roll paper operation unit when the hybrid processing device 1 runs out of roll paper R. When this happens, the CPU 101 cannot execute operating commands telling the roll paper operation unit to perform an operation (including roll paper conveyance commands, printer commands, and cutter drive commands). The CPU 101 can execute other commands, including commands for operating the slip operation unit, changing settings made by the CPU 101 of the hybrid processing device 1, and storing image data for a logo printed on the roll paper R. When an operating command for an operation unit that cannot execute the command is received from the host computer 200 in this limited operation mode, a stop operation mode in which all operation stops is entered.

After entering the limited operation mode, the CPU 101 waits to receive a command sent from the host computer 200 (step S54), and when a command is received (step S54 returns Yes), determines if the received is a real-time control command (step S55).

A real-time control command is a command that is predefined to be executed by the CPU 101 with priority over other commands, and there be one or more real-time control commands. Examples of real-time control commands include a reset command that resets the hybrid processing device 1, a clear buffer command that clears commands and data stored in the receive buffer 104, an auto status back (ASB) command that switches the ASB function that sends the operating status of the hybrid processing device 1 to the host computer 200 on or off, and a command for opening a cash drawer when the cash drawer (not shown in the figure) is connected to the hybrid processing device 1. When the received command is a real-time control command (step S55 returns Yes), the CPU 101 reads and executes the command from the receive buffer 104 (step S56).

The CPU 101 then determines if the offline error was resolved (step S57). If the offline error was resolved (step S57 Yes), normal operation resumes (step S58) and the interrupt process ends.

For example, if the offline error is an error in the print data for the slip operation unit or the roll paper operation unit, and a reset command is received as the real-time control command, the CPU 101 resets the hybrid processing device 1. If the offline error is resolved by resetting, normal operation can resume. Normal operation can also be resumed in step S57 if the offline error is resolved by a user action such as the user adding roll paper R during the limited operation mode or closing the access cover 9, or if the offline error is resolved naturally such as when the temperature detected by the first printhead temperature sensor 75, the second printhead temperature sensor 76, or the thermal printhead temperature sensor 77 drops sufficiently naturally.

If the offline error remains unresolved, the CPU 101 returns to step S54.

If the command received from the host computer 200 in step S54 is not a real-time control command (step S55 returns No), the CPU 101 determines if the command is an operating command instructing the stopped operation unit to perform an operation (step S59). If the command is an operating command for the stopped operation unit (step S59 returns Yes), the CPU 101 switches to the stop operation mode (step S61) and then goes to step S57. Real-time control commands can be received and executed when in the stop operation mode, but other commands cannot be executed. As a result, even the slip operation unit stops operating when an offline error occurs in the roll paper operation unit and the limited operation mode is entered.

When the ASB function is enabled by an ASB command from the host computer 200, the CPU 101 sends status information denoting the current operating status to the host computer 200 on demand by the communication interface 107.

When the stop operation mode is entered, the CPU 101 sends a busy signal to the host computer 200 by the communication interface 107. The busy signal is a signal that is returned when the command sent from the host computer 200 cannot be executed, and is a command requesting the host computer 200 to stop sending commands other than real-time control commands. After receiving the busy signal, the host computer 200 waits without sending commands other than real-time control commands to the hybrid processing device 1. When operation returns from the stop operation mode to the normal operating mode in step S58, the CPU 101 sends a ready signal by means of the communication interface 107. The ready signal is a signal that is sent when commands sent from the host computer 200 can be received and executed, and is a signal requesting the host computer 200 to resume sending commands. As a result of the CPU 101 sending this busy signal and ready signal, the host computer 200 can accurately determine the state of and appropriately control the hybrid processing device 1.

As described above, a hybrid processing device 1 according to this embodiment of the invention has a CPU 101 that executes commands received from a host computer 200 and controls a roll paper operation unit that records on roll paper and a slip operation unit that processes checks, which is a different recording medium that the roll paper, as a plurality of operation units that process roll paper and checks, which represent a plurality of recording media.

When the CPU 101 detects in the normal operating mode that any one of the operation units has become unable to execute commands applied thereto, the CPU 101 switches to a limited operation mode in which commands for that operation unit cannot be executed but commands from the host computer 200 can be received and commands for other operation units can be executed. As a result, the CPU 101 stops operation of only the operation unit that has become unable to execute operating commands due to an error or other reason, but can continue receiving other commands and can continue operating other operation units based on the received commands. As a result, stopping operation of all functions in a hybrid processing device 1 that can perform multiple operations can be reliably avoided when there is a problem with one operation.

When a command for the operation unit that has become unable to execute operating commands is received from the host computer 200 after entering the limited operation mode, the CPU 101 enters a stop operation mode in which receiving further commands and executing commands for other operation units are disabled, thereby avoiding continuing to receive commands that cannot be executed or losing commands that cannot be executed. As a result, the host computer 200 can reliably control the hybrid processing device 1.

Even in the stop operation mode, the CPU 101 can receive and execute real-time control commands sent from the host computer 200, and can send the current operating status to the host computer 200. As a result, the CPU 101 can reliably report the stop operation mode to the host computer 200, and the host computer 200 can reliably control the hybrid processing device 1. The host computer 200 can also control deleting commands that have already been received, and can cause the hybrid processing device 1 to return from the stop operation mode.

When the offline error, which is the reason for entering the limited operation mode, is resolved by a user action such as operating the operating panel 7 (such as turning the power off and on again, or pressing a reset button), opening the access cover 9 and removing a roll paper jam or adding roll paper, or removing a jammed check, or by execution of a specific command received from the host computer 200, such as a command to delete previously received commands, the CPU 101 cancels the limited operation mode and returns to the normal operating mode. As a result, the hybrid processing device 1 can be easily restored to the normal operating mode by means of a user action or sending a command from the host computer 200.

Because the CPU 101 sends a busy signal indicating that operating commands for the operation unit cannot be executed to the host computer 200 when entering the stop operation mode, the host computer 200 can know that the media processing device entered the stop operation mode. As a result, the host computer 200 can efficiently control the media processing device by, for example, stopping sending operating commands to the media processing device or starting an operation that resolves the stop operation mode.

A preferred embodiment of the invention is described above, but the invention is not so limited. For example, the foregoing embodiment describes a configuration having a roll paper operation unit for printing on roll paper and a slip operation unit for printing on checks, but the operation units of the invention are not so limited. For example, a scanner that optically reads checks can also be provided as an operation unit. In addition, a reset command and clear buffer command are used as examples of real-time control commands in the foregoing embodiment, but the invention is not so limited and the specific commands can be any suitable commands from the command system of the device. In addition, the slip print unit in this embodiment of the invention is configured with a dot impact printhead, but the invention can also be used with other types of printheads that are driven mounted on a carriage, including inkjet printheads. In addition, a program that is run by the CPU of a hybrid processing device to perform the above-described operation can be stored to and read and executed from a recording medium inside the hybrid processing device or a storage medium in an external device.

The invention being thus described, it will be apparent to those skilled in the art that it may be varied in many ways. Such variations are not to be regarded as a departure from the spirit and scope of the invention, and all such modifications as would be obvious to one skilled in the art are intended to be included within the scope of the following claims.

What is claimed is:

1. A media processing device comprising:
a roll paper operation unit that processes roll paper and that has a roll paper recording unit for recording on the roll paper;
a slip operation unit that processes slips and that has a slip recording unit for recording on the slips; and
a control unit that executes commands received from a host computer and controls the operation units,
when the control unit detects in a normal operating mode that commands for the roll paper operation unit cannot be executed, the control unit switches to a limited operation mode wherein commands for the roll paper operation unit cannot be executed such that the roll paper recording unit cannot record on the roll paper and commands from the host computer can be received and commands for the slip operation unit can be executed, without switching the control unit to the normal operation mode, such that the slip recording unit can record on the slips, and
when the control unit detects in the normal operating mode that commands for the slip operation unit cannot be executed, the control unit switches to the limited operation mode wherein commands for the slip operation unit cannot be executed such that the slip recording unit cannot record on the slips and commands from the host computer can be received and commands for the roll paper unit can be executed, without switching the control unit to the normal operation mode, such that the roll paper recording unit can record on the roll paper;
wherein the control unit sends a signal to the host computer indicating that commands for the one of the operation units that cannot execute commands cannot be executed when entering the limited operation mode.

2. The media processing device described in claim 1, wherein:
when a command for the one of the roll paper and slip operation units that cannot execute commands is received from the host computer after entering the limited operation mode, the control unit enters a stop operation mode in which receiving further commands and executing commands for the other of the roll paper and slip operation units is also disabled.

3. The media processing device described in claim 2, wherein:
the control unit in the stop operation mode can receive and execute real-time control commands sent from the host computer, and can send an operating status to the host computer.

4. The media processing device described in claim 1, further comprising:
an operating unit;
wherein the control unit cancels the limited operation mode and returns to the normal operating mode when a reason for entering the limited operation mode is resolved by specific input from the operating unit, or by executing a specific command received from the host computer.

5. The media processing device described in claim 1, further comprising:
a first recording media storage unit that stores a supply of the roll paper; and
a second recording media storage unit that stores a supply of the slips;
wherein the roll paper operation unit only processes the roll paper stored in the first recording media storage unit and not the slips stored in the second recording media storage unit, and the slip operation unit only processes the slips stored in the recording media storage units and not the roll paper stored in the first recording media storage unit.

6. The media processing device described in claim 1, wherein:
when the control unit is in the limited operation mode and cannot execute commands for the roll paper operation unit and the control unit receives a command for the slip operation unit, the control unit causes the received command to be executed without switching the control unit to the normal operation mode;
when the control unit is in the limited operation mode and cannot execute commands for the roll paper operation unit and receives a command for the roll paper operation unit, the control unit enters a stop operation mode in which receiving further commands and executing commands for the slip operation unit are also disabled;
when the control unit is in the limited operation mode and cannot execute commands for the slip operation unit and the control unit receives a command for the roll paper operation unit, the control unit causes the received command to be executed without switching the control unit to the normal operation mode; and when the control unit is in the limited operation mode and cannot execute commands for the slip operation unit and receives a command for the slip operation unit, the control unit enters a stop operation mode in which receiving further commands and executing commands for the roll paper operation unit are also disabled.

7. The media processing device described in claim 1, wherein:

when the control unit is in the limited operation mode and cannot execute commands for the roll paper operation unit and the control unit receives a non-real-time command for the slip operation unit, the control unit causes the received non-real-time command to be executed without switching the control unit to the normal operation mode; and when the control unit is in the limited operation mode and cannot execute commands for the slip operation unit and the control unit receives a non-real-time command for the roll paper operation unit, the control unit causes the received non-real-time command to be executed without switching the control unit to the normal operation mode.

8. The media processing device described in claim 1, wherein:

the roll paper operation unit cannot process the slips and the roll paper recording unit cannot record on the slips; and the slip operation unit cannot process the roll paper and the slip recording unit cannot record on the roll paper.

9. The media processing device described in claim 1, wherein:

the roll paper recording unit includes a first printhead, and the slip recording unit includes a second printhead.

10. A media processing device control method that controls a media processing device having a roll paper operation unit for processing roll paper and having a slip operation unit for processing slips, comprising:

executing with a control unit commands received from a host computer and controlling the operation units corresponding to the commands;

detecting in a normal operating mode that commands for the roll paper operation unit cannot be executed, and, when it is detected that commands for the roll paper operation unit cannot be executed, enabling a limited operation mode wherein commands for the roll paper operation unit cannot be executed, and commands from the host computer can be received and commands for the slip operation unit can be executed without switching the control unit to the normal operation mode;

detecting in a normal operating mode that commands for the slip operation unit cannot be executed, and, when it is detected that commands for the slip operation unit cannot be executed, enabling the limited operation mode wherein commands for the slip operation unit cannot be executed, and commands from the host computer can be received and commands for the roll paper operation unit can be executed without switching the control unit to the normal operation mode; and sending a signal to the host computer indicating that commands for the one of the operation units that cannot execute commands cannot be executed when entering the limited operation mode;

wherein the roll paper operation unit has a roll paper recording unit for recording on the roll paper, the roll paper recording unit being unable to record on the roll paper in the limited operation mode wherein commands for the roll paper operation unit cannot be executed, and commands from the host computer can be received and commands for the slip operation unit can be executed; and wherein the slip operation unit has a slip recording unit for recording on the slips, the slip recording unit being unable to record on the slips in the limited operation mode wherein commands for the slip operation unit cannot be executed, and commands from the host computer can be received and commands for the roll paper operation unit can be executed.

11. The media processing device control method as described in claim 10, further comprising:

entering a stop operation mode in which receiving further commands and executing commands for the roll paper operation unit is also disabled when a command for the slip operation unit that cannot execute commands is received from the host computer after entering the limited operation mode; and entering the stop operation mode in which receiving further commands and executing commands for the slip operation unit is also disabled when a command for the roll paper operation unit that cannot execute commands is received from the host computer after entering the limited operation mode.

12. The media processing device control method as described in claim 11, wherein:

in the stop operation mode, real-time control commands sent from the host computer can be received and executed, and an operating status can be sent to the host computer.

13. The media processing device control method that as described in claim 7, further comprising:

canceling the limited operation mode and returning to the normal operating mode when a reason for entering the limited operation mode is resolved by specific input from an operating unit, or by execution of a specific command received from the host computer.

14. A non-transitory computer-readable recording medium storing a program that can be executed by a control unit that controls a media processing device having a roll paper operation unit for processing roll paper and having a slip operation unit for processing slips, the program causing the control unit to execute steps comprising:

executing commands received from a host computer and controlling the operation units corresponding to the commands;

detecting in a normal operating mode that commands for the roll paper operation unit cannot be executed, and, when it is detected that commands for the roll paper operation unit cannot be executed, enabling a limited operation mode wherein commands for the roll paper operation unit cannot be executed, and commands from the host computer can be received and commands for the slip operation unit can be executed without switching the control unit to the normal operation mode;

detecting in a normal operating mode that commands for the slip operation unit cannot be executed, and, when it is detected that commands for the slip operation unit cannot be executed, enabling the limited operation mode wherein commands for the slip operation unit cannot be executed, and commands from the host computer can be received and commands for the roll paper operation unit can be executed without switching the control unit to the normal operation mode; and sending a signal to the host computer indicating that commands for the one of the operation units that cannot execute commands cannot be executed when entering the limited operation mode;

wherein the roll paper operation unit has a roll paper recording unit for recording on the roll paper, the roll paper recording unit being unable to record on the roll paper in the limited operation mode wherein commands for the roll paper operation unit cannot be executed, and commands from the host computer can be received and commands for the slip operation unit can be executed; and wherein the slip operation unit has a slip recording unit for recording on the slips, the slip recording unit being unable to record on the slips in the limited operation mode wherein commands for the slip operation unit cannot be executed, and commands from the host computer can be received and commands for the roll paper operation unit can be executed.

15. The non-transitory computer-readable recording medium as described in claim 14, the program further causing the control unit to execute a step of:

entering a stop operation mode in which receiving further commands and executing commands for the roll paper operation unit is also disabled when a command for the slip operation unit that cannot execute commands is received from the host computer after entering the limited operation mode; and entering the stop operation mode in which receiving further commands and executing commands for the slip operation unit is also disabled when a command for the roll paper operation unit that cannot execute commands is received from the host computer after entering the limited operation mode.

16. The non-transitory computer-readable recording medium as described in claim 15, wherein:

in the stop operation mode, real-time control commands sent from the host computer can be received and executed, and an operating status can be sent to the host computer.

17. The non-transitory computer-readable recording medium as described in claim 14, the program further causing the control unit to execute a step of:

canceling the limited operation mode and returning to the normal operating mode when a reason for entering the limited operation mode is resolved by specific input from an operating unit, or by execution of a specific command received from the host computer.

* * * * *